United States Patent
Genosar (10) Patent No.: US 7,703,336 B2
(45) Date of Patent: Apr. 27, 2010

(54) MULTI-SENSOR MASS FLOW METER ALONG WITH METHOD FOR ACCOMPLISHING SAME

(75) Inventor: Amir Genosar, Boulder, CO (US)

(73) Assignee: Fluonic Inc., Boulder, CO (US)

( * ) Notice: Subject to any disclaimer, the term of this patent is extended or adjusted under 35 U.S.C. 154(b) by 0 days.

(21) Appl. No.: 12/350,897

(22) Filed: Jan. 8, 2009

(65) Prior Publication Data

US 2009/0173166 A1 Jul. 9, 2009

Related U.S. Application Data

(60) Provisional application No. 61/019,600, filed on Jan. 8, 2008.

(51) Int. Cl.
*G01F 1/708* (2006.01)
(52) U.S. Cl. .................................. 73/861.05
(58) Field of Classification Search .............. 73/861.05, 73/861.07; 166/255.1
See application file for complete search history.

(56) References Cited

U.S. PATENT DOCUMENTS

| | | | |
|---|---|---|---|
| 4,195,515 A | 4/1980 | Smoll | |
| 4,346,604 A | 8/1982 | Snook et al. | |
| 4,459,858 A * | 7/1984 | Marsh | 73/861.12 |
| 4,570,492 A * | 2/1986 | Walsh | 73/861.05 |
| 5,741,979 A * | 4/1998 | Arndt et al. | 73/861.05 |
| 6,505,517 B1 | 1/2003 | Eryurek et al. | |
| 6,675,660 B1 | 1/2004 | Mosier et al. | |
| 6,935,192 B2 * | 8/2005 | Sobek et al. | 73/861.95 |
| 7,225,683 B2 * | 6/2007 | Harnett et al. | 73/861.12 |
| 2005/0066747 A1 | 3/2005 | Sobek et al. | |
| 2007/0044572 A1 | 3/2007 | Davis et al. | |
| 2009/0151939 A1 * | 6/2009 | Bailey et al. | |

OTHER PUBLICATIONS

International Searching Authority "Notification of Transmittal of the International Search Report and the Written Opinion of the International Searching Authority, or the Declaration" Feb. 25, 2009.

* cited by examiner

*Primary Examiner*—Jewel Thompson
(74) *Attorney, Agent, or Firm*—Holland & Hart LLP (57) ABSTRACT

A device for measuring fluid flow rates over a wide range of flow rates. The invention is particularly adapted for use in micro-fluidic systems including fluids administration to a body of a patient. The device operates by producing characteristics variations in the fluid, or pulses, that are subsequently sensed by more than one detector spaced apart from the point of creation of the mark to derive a flow rate. Each pulse comprises a small fluid volume, whose characteristics are different from the mean characteristics of the fluid, such as by composition variations created by electrochemical means, such as by electrolysis of a solvent, electrolysis of a dissolved species, or electrodialysis of a dissolved ionic species, or a thermal variation created by focused electromagnetic radiation. The device comprises at least two detectors (also sometimes referred to as sensors) to improve the accuracy of the measurement in varying flow rates, to compensate for errors resulting from the drift of the pulses in the fluid, to compensate for varying or unstable flow rates, and to establish a positive signal for sub-range flow. A method of measuring fluid flow rate is proposed where measurements comprising data of one mark from at least two sensor readings plus one other time event are combined to determine the reported flow rate.

29 Claims, 8 Drawing Sheets

MULTI-SENSOR MASS FLOW METER ALONG WITH METHOD FOR ACCOMPLISHING SAME

FIELD

The present invention relates generally to a device for the detection of fluid flow rates over a wide range of flow rates (<1 nL/min to >100 .mL/min) and particularly for a device for detection of fluid flow rates by Time-Of-Flight technique.

BACKGROUND

Several mass-flow meters operate by producing characteristics variations in the fluid, or pulses, that are subsequently detected downstream from the point of creation to derive a flow rate. Mass-flow-meters which utilize this arrangement are generally referred to as Pulse Time-Of-Flight flow meters.

One such approach described in U.S. Pat. No. 4,532,811 to Miller, Jr. et al. applies a thermal pulse to a stream of fluid and has a single downstream heat sensor to sense the thermal pulse. The transit time between the heating element and the heat sensor determines flow velocity. The Miller thermal pulse technique is effective over a wide range of fluid temperatures, because the unheated fluid is used as a reference. The downstream sensor detects thermal pulses, i.e. envelopes of fluid traveling through the flow conduit that are warmer than the unheated fluid. Therefore, the thermal pulse technique is advantageously insensitive to changes in ambient temperature.

A major disadvantage of Miller's approach is measurement error associated with the transfer of heat to and from the fluid, and the transient time it takes the mark to integrate into the developed flow profile. Because the flow rate of the fluid at the edge of the flight conduit it less than the flow rate at the center of the conduit, the mark does not reach its equilibrium flow rate until its average position has moved to the center of the flow conduit. This rate of equilibration is associated with the thermal masses, thermal conductivities, heat-transfer coefficients of the heating element, sensor and fluid, and the viscosity and density of the fluid (i.e. Reynolds number), and must be accounted for when calculating flow rates. Since the delay is related to the properties of the fluid, the flow meter inconveniently must be recalibrated for different types and concentrations of fluids. Miller's approach assumes the flow rate from two time events associates with two identified positions of the mark as it conveys downstream with the flow, from which a single velocity of the mark can be derived and therefore a single flow rate can be derived per each mark detected. Miller's approach therefore can not extract additional information which is essential for deriving a more accurate determination of the flow rate. For instance, Miller's approach can not derive if the detected instant was during stable, accelerating, or decelerating speed. Such information could be beneficial to analyze the flow rate nature and to improve the conclusion of the average flow.

U.S. Pat. No. 5,533,412 to Jerman, et al. improves upon Miller's approach by providing at least two spaced apart sensors located along the flow conduit, downstream from the thermal marking position and the flow velocity is derived from the transient time it takes the pulse to travel between two sensors. The advantage of Jerman's approach is that it overcomes most of the fluid properties affects which degraded the accuracy in Miller's approach.

One significant drawback with the Jerman and Miller approaches is that it is inconvenient to have multiple detectors spaced downstream from the thermal marking position. Because it is preferred to use optical detection to note the arrival of the mark, it can become prohibitively expensive to use multiple detectors, as each additional diode and detector combination adds costs, and will require multiple alignments and calibrations of the optical components. As in Miller's approach Jerman's approach derives the flow rate from two time events for each mark and therefore has limited capacity of accurately concluding the average flow.

U.S. Pat. No. 6,660,675 to Mosier et al and continuation in part U.S. Pat. No. 7,225,683 to Harnett et al disclose a device for measuring over a wide range of flow rates which operates by marking the fluid by producing compositional variations in the fluid, or pulses, that are subsequently detected downstream from the marking position to derive a flow rate. Each pulse, comprising a small fluid volume, whose composition is different from the mean composition of the fluid, can be created by electrochemical means, such as by electrolysis of a solvent, electrolysis of a dissolved species, or electrodialysis of a dissolved ionic species. Measurements of the conductivity of the fluid can be used to detect the arrival time of the pulses, from which the fluid flow rate can be determined. A pair of spaced apart electrodes can be used to produce the electrochemical pulse mark.

The above listed prior art approaches suggest manufacturing techniques in a silicon chip made by micro-etching a silicon substrate and film deposition techniques i.e. using semiconductor micromachining technology.

Several patents disclose means for extending the dynamic range of the flow sensor U.S. Pat. No. 5,533,412 to Jerman, et al. discloses a flow sensor where velocity is measured in two portions of the channel, the portions having different cross-sectional areas, thereby providing different flow velocities. The narrower channel portion is used for measuring low flows, and the wide channel portion is used for measuring higher flows. This combines the dynamic ranges of the two portions, thereby substantially increasing the overall dynamic range of flow meter. Mosier and Harnett respectively disclose a three electrode configuration in which multiple pulse generators are spaced at unequal distances from the sense electrodes: the smaller in distance serves for measuring lower flow rates and the larger in distance serves to measure higher flow rates. This configuration advantageously increases the potential dynamic range of the sensor chip, but it disadvantageously requires the user to choose a write electrode (and its associated range) before use, and still only uses two time events to calculate the flight time of the marker.

It is a common practice in water metering applications and industrial flow metering applications to extend the dynamic range of the measurable flow rates by installing two or more flow meters, having a different dynamic range, in parallel. Preferably said water meters have a slight overlap in their dynamic range. At least one valve is set in the system to direct the flow to the lower flow range meter when the flow is not exceeding that range.

Prior art Time-Of-Flight techniques suffer from the following main disadvantages that effect the measurement accuracy and will be described herein:

In the prior art approaches it is assumed that if no pulse has been detected by the sensor then there is no flow (or zero flow). This approach can be referred to as negative detection. The disadvantage of negative detection is that it cannot differentiate lack of performance (such as out of measurable range flow rates) or malfunction of the meter where the pulse had not been detected for other reasons rather than zero flow (i.e. false negative detection). In other words, as some times referred to in this art, the meters in the prior art cannot differentiate between false-negative and true-negative. The reliability and accuracy of sensing zero flow is in several applications as significant or even more important than the accurate reading of real flow. For example in medical drug delivery applications it will be extremely important to prevent a situation where drug is being administered when it shouldn't or where it can not be monitored. In another drug delivery example a reliable (preferably positive) sensing of zero flow is important for detecting occlusion of the administration device or kink in the tube set of the delivery system etc. Mistakes in reading zero flow may result in serious error leading to hazardous situations or even a cause of death.

Also, prior art TOF MFM cannot distinguish between air bubbles and zero flow and therefore may introduce errors due to the presence of bubbles, or any other substantial change in the properties of the fluid. Another disadvantage of the prior art is that errors caused by diffusion (fading) of the pulse (mark) in the flow are ignored. The marker, be it thermal or composition variation, disposed in the flow has a tendency to diffuse and haze in the fluid. This tendency become significant at very low flows where the linear diffusion rates are competitive with the actual flow rate. The diffusion rate depends on the fluid properties and needs to be calibrated in currently disclosed methods. None of the known prior art Time-of-Flight flow meters provides a solution to the significant error that diffusion will cause at very low flows.

Another disadvantage of Time-Of-Flight measurement techniques proposed in the prior art is that they are sensitive to errors caused by sharp variations in the flow. The prior art techniques disclose means for calculating the flow based on two time events recorded for each mark. These time events may be the time of introducing the mark to the flow and the time that the mark reached a first sensor (Miller, Harnett, Mosier). Alternatively the two time events are proposed to be the time that the mark was detected by a first sensor and the time that the mark was detected by a second sensor spaced apart from the first sensor along the flight conduit (Jerman). The flow rate is calculated as an average flow rate over the transient time between two events, which may translate into significant errors if the flow is experiencing rate changes or if the base flow is low relative to noises (vibration) in the flow. Yet in various settings the flow may experience sharp variations in rate, which will affect the accuracy of the reading. For example if the meter is located in proximity with a pulsating pump the reading can give a wrong average if the measuring cycle is similar in length to numerous pulsation cycles. Another example of sharply varying flow is a drug delivery tube set where impacts on a relatively flexible tube set create pressure waves in the flow leading to vibrations in the flow rate. In another example of unstable flow, a pump is activated for a very short on-cycle and returns to an off cycle immediately thereafter, creating a sharp flow pulse which does not have a momentary stable flow. Therefore any attempt to conclude an average of the flow rates from two time events will most likely result in extreme errors.

It is therefore an object of the present invention to provide means for improving the accuracy of prior art Time-Of-Flight mass flow metering techniques by correcting for the diffusion rates of the pulse at very low flows.

It is another object of the present invention to provide improvement to prior art Time-Of-Flight mass flow metering techniques by reducing errors due to varying flow by calculating flow rates from at least three time events of the mark.

It is another object of the present invention to provide improvement to prior art Time-Of-Flight mass flow metering techniques by reducing errors due to diffusion by incorporating data from at least three time events. Such an improvement can include the use of an algorithm that incorporates at least a first derivative of the flow rate. The multiple readings of a mark support an algorithm incorporating a complex model of fluid flow, in order to fit the equations of flow.

It is yet another object of the present invention to provide means for positively detecting zero flow.

It is another object of the present invention to detect air bubbles and eliminate flow reading errors due to the presence of air bubbles.

It is yet another object of the present invention to integrate other sensors and devices with the meter platform including sensors for measuring or monitoring temperature, pressure, pH, free oxygen, viscosity, G-shock.

It is yet another object of the present invention to provide means for detecting viscosity of the fluid and variation in viscosity, and correct flow measurement errors.

It is another object of the present invention to provide means to detect fluid base conductivity and variations in the fluid base conductivity and provide indications of the fluid properties. In particular in medical application to alarm if there's suspect that the wrong fluid is administered to a patient.

SUMMARY

In accordance with these objectives, provided are devices and methods relating to mass flow rate metering systems. In accordance with one aspect, a device is provided for use in a mass flow rate metering system which incorporates a flow medium traveling along a flow path towards a destination that utilizes the flow medium. Broadly, the device comprises a flow conduit, at least one mark depositor and a plurality of mark detection sensors. The flow conduit is insertable into at least a portion of the flow path to define a flow channel. The conduit has an inlet and an outlet, wherein the outlet includes a coupler for establishing fluid communication between the flow conduit and the destination. The flow conduit can be a single channel or it can branch into at least two parallel portions.

The mark depositor is operatively connectable to a signal generator to introduce at least one mark into the flow channel at an introduction location and thereby cause a variation in the flow medium. Each of the mark detection sensors comprises at least one electrode having an associated detection portion disposed in the flow channel in direct contact with the flow medium. Each sensor is configured to detect variations in the flow medium caused by introduction of the mark(s). Another embodiment of a device detects zero or sub-range flow. Here at least one of the sensors is situated downstream from a mark introduction location for use in detecting the mark as it travels in the downstream direction. Another one of the sensors is situated elsewhere along the flow conduit for use in detecting diffusion and convection of the mark.

The mark depositor of the various embodiments may comprise at least two electrodes in direct contact with the flow medium, at least one of which may be shared with a sensor electrode. Similarly, a plurality of the sensors may share common electrode(s). In one embodiment, each sensor is situated downstream of the introduction location. Alternatively, at least one of the sensors may be situated downstream of the introduction location to detect the mark as it travels in a downstream direction, while at least another of the sensors is situated upstream of the introduction location to detect diffusion and convection of the mark.

Alternatively, one sensor may be situated downstream of the introduction location while another sensor has its associated detection portion disposed along the flow channel at a position which is not downstream of the first sensor. For flow range applications having anticipated flow rates up to approximately five (5) liters per hour, each sensor is preferably located within a range that is between approximately 100 µm (micrometers) to approximately 50,000 µm (micrometers) from the introduction location.

Methodologies are also provided. One embodiment of a methodology for deriving flow rate comprises depositing a mark into the flow conduit at an introduction location. A plurality of spaced-apart sensors take a plurality of respective time-of-flight (TOF) readings after introduction of the mark into the flow conduit. Flow rate is then ascertained based on these TOF readings. A plurality of instant flow rates of the mark may be derived from the plurality of TOF readings, and the flow rate is ascertained from these instant flow rates and at least a first derivative in time of at least one instant flow rate. The method may further comprise inputting the flow rates and their respective derivatives into a flow curve approximation formula. According to the method, one sensor may be situated downstream of the introduction location while another is at a position which is not downstream, whereby TOF readings by the non-downstream sensor are used to derive at least one of a mark diffusion rate, a diffusion correction factor, zero flow or sub-range flow.

Methods are also provided for detecting zero or sub-range flow rates. According to one embodiment of such a method, a mark is introduced into the flow conduit at an introduction location. At least a first TOF reading is taken from a first sensor and at least a second TOF reading is taken from a second sensor that is spaced apart from the first sensor along a flow direction. An existence or non-existence of zero or sub-range flow is then ascertained based on the first and second TOF readings. An alternative approach to detecting zero or sub-range flow comprises taking at least a first TOF reading from a sensor and ascertaining an existence or absence of zero or sub-range flow based on the TOF reading(s)s and a known diffusion rate of the mark within the flow conduit. Here it is preferred that the sensor be located within approximately 500 µm (micrometers) from the introduction location. These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 1b shows an exploded view of the embodiment of FIG. 1a;

DETAILED DESCRIPTION

The present invention discloses an improvement to prior art Time-Of-Flight mass flow metering techniques by incorporating at least one additional sensor, for detecting the mark along the fluid conduit of the meter, downstream from the pulse generator position and spaced apart from the first sensor. A flow rate calculation method is optimized for improving reading accuracy by using at least three time events associated with determination of three positions of the mark over time as it is conveyed with the flow and dissipate in the flow.

The three events can be the time of generating the pulse, the time the pulse is detected by a first sensor, and the time the pulse is detected by a second sensor spaced apart from the first sensor downstream from the first sensor. Alternatively the three events can be the time that the pulse has been detected by three spaced apart sensors. By using at least three time events of each mark, a more sophisticated algorithm can be used to calculate flow rate, for instance by incorporating the effects of diffusion, and thereby improve the accuracy of the calculated rate. In one embodiment, the shape of the pulse measured by the sensor will be used to conclude fluid properties such as diffusivity or viscosity. In such an embodiment it is preferable to analyze the peak shape at more than one sensor to improve the resulting data fit. At least three time events are advantageous for the calculating of flow rate in unstable conditions, e.g. during pulsatile flow. By determining various consequent instant flow rates of a specific mark, derivatives of the flow rate can be calculated and applied to a flow curve approximation formula providing far more accurate average flow rate values than the prior art. In its simplest form the first derivative of the instant flow measurement will determine if the flow is stable, increasing, or decreasing (tendency of the flow rate) and have that tendency determination applied to a formula that provide more accurate determination of the average flow rate. In a more sophisticated embodiment of the present invention. Such flow curve approximation formula may incorporate a Taylor series, which can help determine an order in the flow regime (flow curve). The more sensors located along the flow conduit, the more instant flow rates that can be determined for a single mark, and there from the higher level of derivatives that could be applied to the Taylor series resulting in a more accurate deriving of the flow curve and the flow rates. Additional sensors can optionally be added to the system to further improve the accuracy of the calculated flow rate.

Figure 15A:
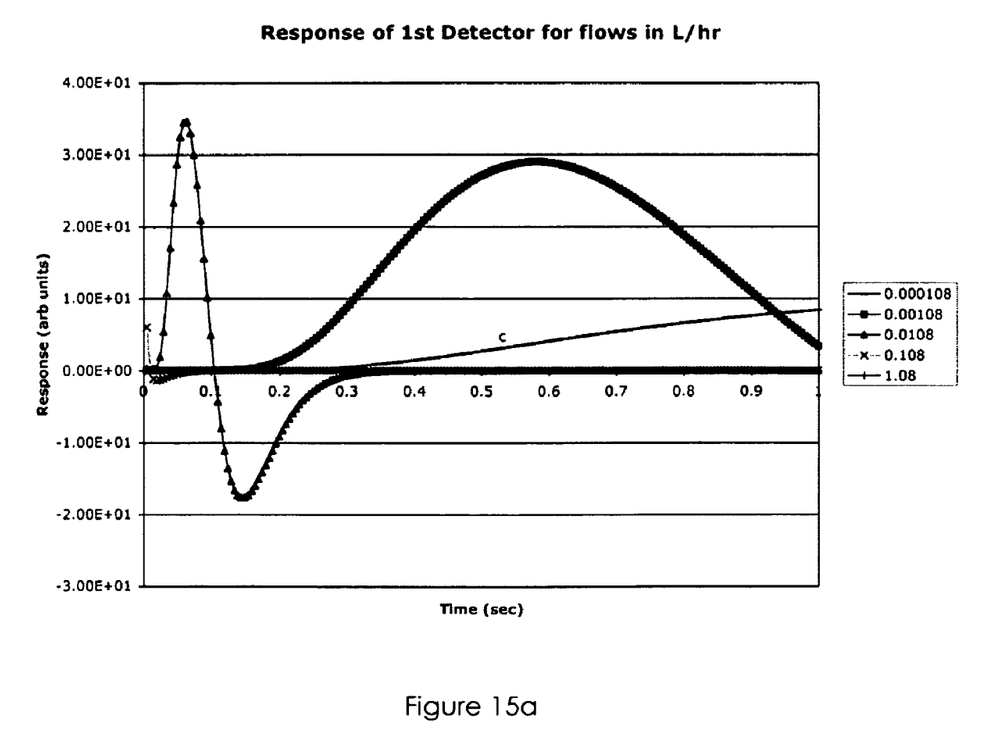
FIG. 15a plots response data from a first sensor, and particularly, the magnitude of the change in conductivity as a function of time.

An example of data coming from a modeled sensor is shown in FIG. 15a, which plots the magnitude of the change in conductivity as a result of the presence of the marker (in arbitrary units) versus the time that has passed since the initial 'write' pulse. In operation, the device writes a marker to the fluid one time per read interval, and in FIG. 15a the read interval is one second. In this figure, the flow channel is approximately 300 microns deep and 3 mm wide, and the read sensor is located 250 microns downstream from the write electrodes. The flow rates plotted in FIG. 15a range over 4 orders of magnitude, from 0.1 mL/hr to 1 L/hr.

A given sensor operates by taking data periodically or continually, and the assembled data can be analyzed after a read interval to determine information about the peak center and shape.

Figure 15B:
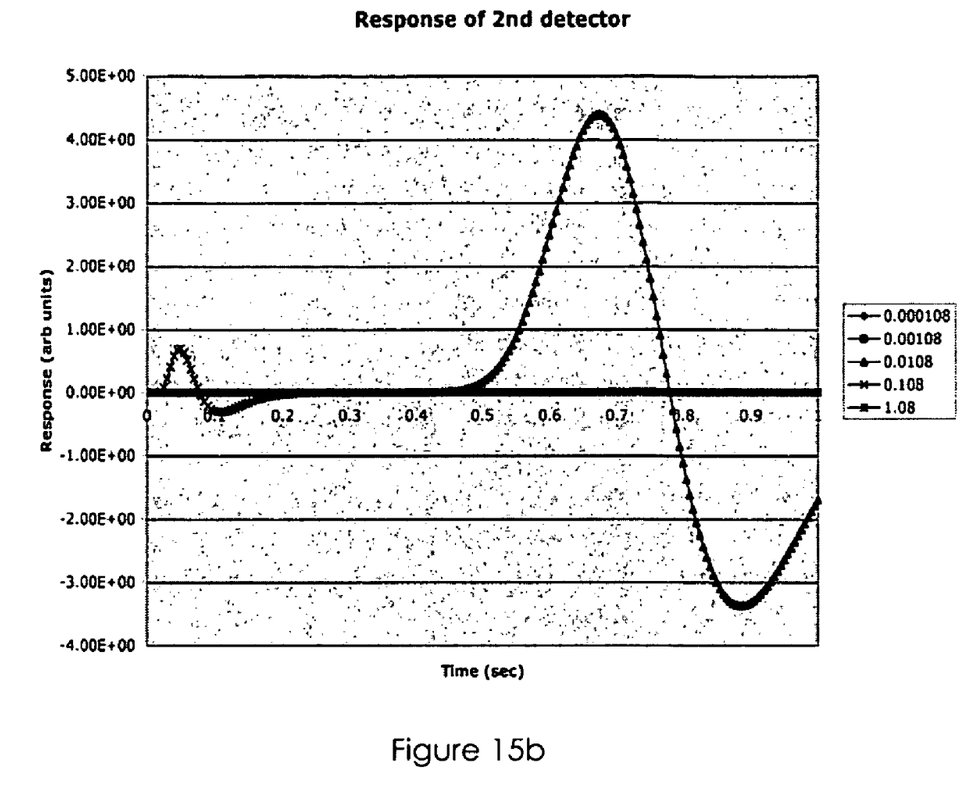
FIG. 15b plots response data from a second sensor, and particularly, the magnitude of the change in conductivity as a function of time.

With reference in FIG. 15a to a flow rate of 1 mL/hr, the peak shown is broad due to the competition of diffusion with advection, and it is roughly centered at 580 ms. At a flow rate of 10 mL/hr, the peak is much sharper as advection dominates over diffusion, with a peak roughly at 65 ms. At a higher flow rate of 100 mL/hr, the peak has almost completely passed by this sensor, detectable only at an initial read time of 5 ms. FIG. 15b shows the modeled response of a sensor 2.5 mm downsteam from the write electrode. In this sensor, a marker swept up in a 10 mL/hr flow elutes at about 680 ms, and the signal is far broader than it was at the first sensor, as a result of increased diffusion during the increased time lag. This broadness depends on the diffusivity of the marker in the fluid, which in turn depends on factors such as temperature or viscosity. The resulting sensor peaks can be fit to an equation or series of equations of flow that consider variables which can include, but are not limited to: channel geometry, electrode geometry, width of the write pulse, distance between read and write electrodes, temperature, viscosity, fluid conductivity, and flight time for a given sensor data point. Acquisition of data from multiple read sensors can considerably improve the ability of an equation or set of equations to fit all the data in an accurate and reliable fashion. Conventionally, the flight time for a given peak can be defined as the point of maximum intensity for the data during the read interval. However, the flight time for a given peak can alternatively be defined as the time where the peak reaches 50% of its eventual maximum, or 10%. or another value, as long as corrections are made to the equations converting flight time to flow rate. In the most preferred embodiment, however, the flight time is defined based on data from the entire curve, rather than on a single or small number of data points.

In many application it is desired to have an accurate flow sensor that needs no calibration. As explicit above to improve the accuracy of a Time-of-Flight meter it is desired to determine corrections of errors due to diffusion and viscosity. In the embodiments of the present invention the diffusion of the mark will cause the mark to broaden: a) perpendicular to the flow conduit usually from the wall where it was introduced toward the center of the flow conduit, and b) along the flow conduit in the upstream and downstream directions. In super laminar Newtonian flows the diffusion determines the rate at which a mark that was generated at the electrodes in the introduction location on the wall of the flight conduit of progression of the mark toward the center of the flow channel; and the viscosity determines the relative flow velocities between the fluid layers between the wall (where zero flow is assumed) and the center of the flow conduit. Thus the higher the diffusion rate is the faster the mark will be picked up by higher flow velocity fluid and the mark will arrive earlier at the mark detection sensor.

Therefore in one embodiment the determination of flow rate as a function of time of flight is defined by:

$$Q = F_{(viscosity)}(t) * F_{difusion}(t) * F_{TOF}$$

Where:

Q is the calculated mass flow rate $F_{(viscosity)}(t)$ is a correction function to the fluid viscosity on the time of flight $F_{difusion}(t)$ is a correction function to the fluid diffusion rate on the time of flight $F_{TOF}$ is the function applied to the instant flow rates and their derivatives to assert flow rates.

and star (*) means applying a function such as multiplication

Therefore determination of diffusion effects and viscosity effects on the time of flight are critical for determining the actual flow rates from the time of flight of the signal. As shown above viscosity and diffusion rates effect not only the arrival time of the mark at the sensor but also the intensity and shape of the mark. By measuring and analyzing the amplitude and shape of the curve the accumulated effect of diffusion and viscosity can be determined. The current invention further proposes a method for the device of the present invention to determine diffusion rates of the mark and therefore construct Fdifusion(t). By knowing the diffusion rate Fum(t) can now be analyzed from the shape and amplitude of the mark. A good approximation of effects of viscosity and diffusion on the mark (and therefore on time of flight) can only be achieved by multiple reading of the mark over time and monitoring changes in its shape and intensity.

In a preferred embodiment, the calculation algorithm uses those (at least) three time event to calculate two instantaneous flow rates of a mark and to calculate at least a first derivative of the instantaneous flow rate, thereby producing a more accurate flow rate determination.

The present invention further discloses an improvement to prior art Time-Of-Flight mass flow metering techniques by incorporating at least a second sensor capable of detecting the mark along the fluid conduit of the meter, proximate to the pulse generating position for providing positive detection of sub-range flow. In one preferred embodiment, this sensor is positioned upstream from the pulse introduction location. In another preferred embodiment, this sensor share at least one electrode with the mark deposition electrode pair. In another preferred embodiment, this sensor comprises the mark deposition electrode pair, used in a sensing configuration immediately after been used as deposition electrodes. In another preferred embodiment, at least one of the sensor electrodes is positioned between the mark deposition electrodes. In another preferred embodiment, this sensor is immediately downstream of the mark introduction location. In another embodiment, the at least two sensors comprise three electrodes in total, where the first sensor can be for instance comprised of the first and second electrodes, and the second sensor comprised for instance of the second and third electrodes. Any of these configurations can be used as components in a method for positive detection of zero-flow or sub-range flow.

In one embodiment a first sensor is located immediately proximal and down stream to the mark introduction location and a second sensor is located immediately proximal and upstream to the mark introduction location at equal distance from the mark introduction location as the first sensor, such that in the event of no flow, the first sensor and the second sensor will detect the dissipation of the pulse at the same time and confirm that there's no flow. At very low flows the first sensor will detect the pulse earlier than the second sensor and the actual flow rates will be determined as a function of difference in the detection of the pulse by the first sensor and the second sensor.

In the present invention the term fluid generally refers to any media that behaves like fluid in accordance to the functionality of the present invention including liquids, gasses, gels, pastes, emulsion, flowable solid particles such as powder or dust, or a combination thereof.

The term downstream generally refers to a location in the flow conduit based on the expected direction of flow. It will be obvious to those skilled in the art that flow may also occur in two directions and by the appropriate arrangement still under the present invention flow rates can be measured in both direction along the flow path.

The mark may be, alternatively to a pulse, a pulse superimposed on base signal, a series of pulses of the same type or the same characteristics, a combination of pulses.

In some embodiments the mark is a composition variation in the flow as is disclosed by U.S. Pat. No. 6,660,675 incorporated herein by reference in its entirety. In one embodiment the mark is introduced by electric pulses to a pair of electrodes in direct contact with the flow, and the sensors are a pair of electrodes which measure conductivity.

In some embodiments the mark is a thermal mark as is disclosed by U.S. Pat. No. 5,533,412, incorporated herein by reference in its entire.

In other embodiments the mark can be any kind of electric field effect, magnetic field effect, electromagnetic field effect, radiation, or thermal effect that can be applied to the flow with the condition that it could be detected by the sensors, including ionization, temperature, concentration of substance or objects in the fluid (such as micro bubbles or solid particles) molecular structure or arrangement of molecules or other change of the fluid.

A flow meter's dynamic range limits are defined by the minimum and maximum measured flow rates. To improve dynamic range, one embodiment of the present invention measures velocity in two portions of the channel, the portions having different cross-sectional areas, thereby providing different flow velocities. The narrower channel portion is used for measuring low flows, and the wide channel portion is used for measuring higher flows. This combines the dynamic ranges of the two portions, thereby substantially increasing the overall dynamic range of the flow meter. In another embodiment the dynamic range is extended by having the sensors spaced at different relative spacings from one other where the closer sensors serves to measure lower flow rates and the more distant sensors are used to measure higher flow rates.

The present invention provides means for measuring and/or correcting for the diffusion rate of a mark in the flow, sometimes referred to as zone broadening. The different types of marks described above have a tendency to fade by diffusion in the fluid. At very low flow rates diffusion contributes to an error effect on Time-Of-Flight mass flow meters as the transient time between two positions results from the combination of the rate that the fluid is actually flowing and the rate that the mark is spreading in the flow.

A diffusion meter of this invention could consist of at least a first sensor positioned along the flow conduit downstream from the position of introducing the mark, and at least one second sensor positioned proximal to the position of introducing the mark, preferably (but not limited to) upstream from the point of introducing the mark. When the flow rate in the conduit is lower than or comparable to the diffusion rate of the mark in the fluid, the mark will be diffusing upstream from the introduction point and will be sensed by the second sensor. In one embodiment, the development of the mark (including its amplitude, zone broadening, curve, shape) at the first sensor is compared with that at the second sensor, and that information is used to assert values of the diffusion rate viscosity, or correction factors to diffusion effects and viscosity effects to the TOF reading and improve the conclusion of the actual mass flow rate. The present invention therefore provides means for improving Time-Of-Flight mass flow metering techniques by: a) correcting errors due to diffusion rates of the mark in the fluid and viscosity effects, b) extending the dynamic range of the meter to rates where diffusion effects are significant, and c) providing additional means for determining fluid properties such as viscosity that affect the development of the marker downstream, and d) improve the estimate of actual flow in varying use conditions.

In addition the present invention provides means for positive detection of zero flow or sub-range flow. In one embodiment, a set of sensors is located proximately to the mark's introduction position, such that under normal flow conditions the mark would be downstream of the sensors by a first measurement time, and therefore these sensors would not register the mark. Under conditions of occlusion, the mark would be detected by this set of sensors at the first measurement time, and possibly at subsequent measurement times.

In one embodiment, this set of sensors is downstream from, but proximate to, the mark's introduction location. In order to be able to sense flow resulting primarily from diffusion (for instance, with Peclet number $\ll 1$), sense electrodes are ideally positioned within 500 microns of the write electrodes, even more preferably within 250 microns of the write electrodes. Conventional flow rates (in-range flow) are not detectable by these electrodes because the marker has flowed substantially past these electrodes by the beginning of the read interval (sense operation), but sub-range flow and zero flow will register a signal using these electrodes during the read interval, whereas this sub-range flow will not be detectable by the conventional read electrodes during this read interval (the flow is too slow to deliver the marker to them).

In another embodiment, this set of sensors can be at or within the mark's introduction position, or slightly overlapping with this point, for instance in the case where a mark introduction electrode or electrodes are subsequently used as sensors at the first measurement time. In the case where the mark introduction electrodes are subsequently used as read electrodes, the amplitude of the signal will be highest immediately after the write step, and will subsequently degrade due to a combination of diffusion and flow. In such a case, flow can be estimated at this electrode alone by fitting the amplitude as a function of time as received by this set of electrodes. In another embodiment, this set of sensors is positioned upstream from the mark's introduction point, such that it can sense the mark in the absence of flow, possibly only from the spreading of the mark over the read electrodes by diffusion.

In both embodiments, a method is required for sensing sub-range or zero flow and distinguishing it from expected flow rates. For a channel about 100 microns deep and 1 mm wide, the marker will slowly diffuse upstream and downstream over time such that, over the course of one second, it may be detectable as far away as 400 microns, depending on the signal/noise ration of the system. For conventional flow, it will be possible to assign a time associated with a peak in signal intensity as the marker flows past the sense electrode; however, for zero- or sub-range flow, no such peak will exist. In a preferred embodiment, the cell will be designed so that this does not occur for in-range flow, so that the marker has completely cleared the sense electrode before a subsequent marker has been created. If this condition is not met, it becomes more difficult to correctly identify the peak (and therefore the time of flight) of subsequent pulses).

Sub-range or zero flow may thus be positively defined as the case where the peak of the pulse has not fully developed during the read interval. Again in reference to FIG. 15*a*, for a flow rate of 0.1 mL/hr, the marker has not peaked during the one second read interval. This flow rate is thus considered sub-range for this channel and electrode configuration at this read interval, whereas flow rates of 1 mL/hr to 10 mL/hr would be considered in range.

More practically, sub-range flow may be indicated as any case where the marker flows sufficiently slowly that it cannot clear past the detector(s) during a single read interval, and in FIG. 15*a* a flow of 1 mL/hr could be considered sub-range for this configuration and read interval if signal/noise is sufficiently good to detect the marker at the end of the read interval. Sub-range flow may also be defined by the Peclet number of the flow regime, where a Peclet number <1 is dominated by diffusion rather than advection, and a Peclet number <<1 may be considered sub-range Sub-range flow may be detected by fitting the signal growth at an electrode proximal to the write electrode as a function of time, where the peak is not seen during the read interval, or where the tail of the signal has not cleared the detector during the read interval.

If, for instance, an occlusion or pinching of the system results in sub-range flow, subsequent write pulses will 'overwrite' the previous pulses. As a result, a simple algorithm that models the diffusion of a single pulse will not properly model the signal that develops over multiple read intervals in the case of sub-range flow. After several pulses, an equilibrium will be established, wherein the magnitude of signal generated will remain constant over time as long as the read interval is not altered, and as long as the condition of the electrodes does not change. A method of detecting sub-range flow that compares the measured detector data versus the expected growth and equilibration of signal over multiple read intervals is desirable. In one embodiment, a system incorporating a mass flow sensor can adjust its read interval or halt measurements so as not to continually write pulses to the same volume of fluid.

Where the flow measuring technique is electric composition variation time of flight, the flow sensor in one embodiment comprises a silicon or glass chip made by microetching a substrate, with the electrodes comprising a metal deposited using standard film deposition techniques. Such sensors find particular utility in a wide variety of medical applications, such as precise intravenous, transdermal or intradermal drug delivery. In another embodiment, the sensor is fabricated using plastics, for instance by injection molding or embossing.

More particularly, the marking element and the sensors are formed in situ on integral members extending across a channel of the substrate. In one embodiment, the conductive members are formed by deposition and etching, followed by etching the channel in the substrate to define the lower half of the flow path. A glass or silicon cover with a channel similar to that etched in the substrate is bonded to the substrate. The channel on the substrate and the channel on the cover are aligned to form an enclosed flow path of known cross-sectional area. The exciting electrodes and sensors are deposited on the bridging members which traverse the enclosed flow path, and so are in contact with the fluid stream. In one embodiment, the bridging members approximately bisect the enclosed flow path formed by the substrate and matching cover.

In another embodiment, the channel is patterned and etched on a first substrate using standard microfluidic processes. The electrodes are patterned on a second substrate, which is subsequently bonded to the first substrate to create an enclosed channel in direct contact with electrodes on one surface. Thru vias can also be patterned and drilled through either the first substrate, the second substrate, or both, in order to provide an opening for electrical and fluidic connections.

In one embodiment the flow meter is confined within an electric and magnetic conductive cage which prevents external electric, magnetic and electromagnetic interference.

An advantage of this device is that individual flow sensors need not be calibrated once the design has been characterized if fabrication process tolerances are precisely maintained. If the flow channel cross-sectional area and sensor spacing are maintained within a desired range (achievable by processes including, but not limited to, those using conventional semiconductor and micromachining processing techniques, plastic injection molding, or embossing) then volume and flow calculations can be made to achieve a result relatively insensitive to any other parameters, including fluid properties, exact heater and sensor characteristics, or exact electronic gains or offsets. In addition, accuracy over a range of ambient and fluid temperatures is also maintained.

Fabrication by micromachining has the additional advantage of enabling manufacture of many flow meters simultaneously on a single low-cost substrate, lowering cost per unit. Moreover, this technique is capable of fabricating channels with small sizes, which enables measurement of very low flow rates given precise manufacturing tolerances.

In another embodiment of the system, the sensor is fabricated by combining three separate substrates. In one embodiment, the bottom substrate is a flat piece of glass, which optionally supports patterned electrodes and/or thru vias to enable electrical and/or fluidic connections; the middle substrate is a thin piece of glass with channels etched through its thickness; and the top substrate is another piece of glass, which again optionally supports patterned electrodes and/or thru vias to enable electrical and/or fluidic connections. These pieces are subsequently assembled to form an enclosed channel. In systems where both the top and bottom substrates contain patterned electrodes, a bonding tool with alignment capabilities can be used to ensure that the electrodes on each surface are properly oriented relative to each other.

In another embodiment of the invention the flow meter is manufactured on a different substrate. For example the flow meter can be manufactured on a printed circuit board (PCB) where the flow path is created by a channel in a first layer of the circuit board sealed by a second layer of the circuit board. The electrodes are printed on the first layer of the circuit board facing the second layer of the circuit board. The electrodes are in conductive contact with an electronic circuit such as an amplification circuit and processor.

In another embodiment of the invention the flow meter is manufactured around a tube or a fitting in which the fluid flows.

As will be obvious to those skilled in the art, a redundancy of the mark generators, the sensors, or the entire flow meter of the present invention on a single fluid passage can be advantageous for improving the reliability of the data and/or the reliability of the flow meter.

In a further embodiment of the present invention sensors are located in a first direction along the flow passage from the marking position, and in a second direction from the marking position along the flow path, providing the capability to measure flow in opposite directions in the flow passage. In one embodiment where the flow measurement technique is electric composition variation time of flight, the pulse generating electrodes and the sensor electrodes switch function from excitation electrodes to conductivity sensing electrodes and vice versa to measure flows in opposite directions.

A flow meter in accordance with the invention can advantageously be integrated with a human machine interface (HMI) such as a screen and a keypad, or a machine-machine interface such as communication channels with a control circuit, and provide data, alarms, and automatically control outputs. A flow meter in accordance with the invention is useful with a closed loop flow control system for delivery of intravenous, intra-dermal or subcutaneous drugs. Another advantageous application for the flow meter of the present invention is a diagnostic device, in particular a diagnostic device in the fashion of a lab on a chip.

In one embodiment of the present invention additional sensors are incorporated on the meter platform including temperature, pressure, shock (G), air bubble detector, concentration detector, specific gravity detector or other sensors known in the art. In one embodiment the sensors and/or the mark generator provide at least part of the components for the additional sensors. In another embodiment the sensor comprises data logging capability.

Figure 1A:
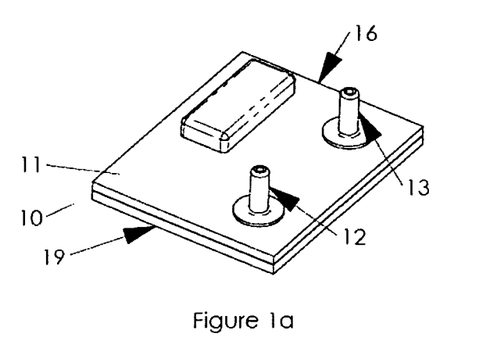
FIG. 1a shows a perspective view of a preferred embodiment of the Time-Of-Flight mass-flow-meter.
Figure 1B:
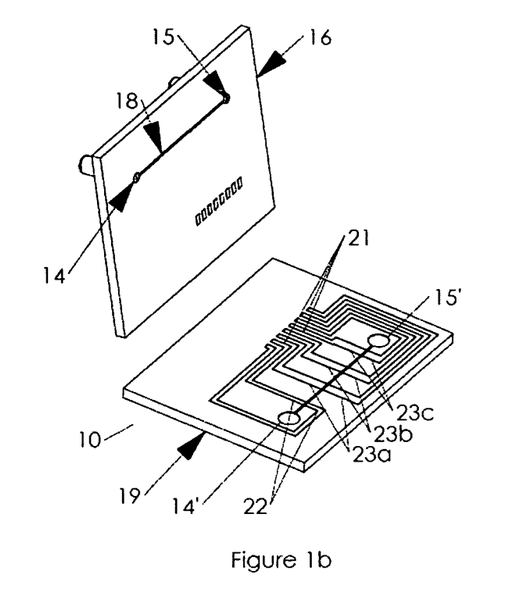

Collectively, FIGS. 1a & 1b show a preferred embodiment 11 of the Time-Of-Flight mass flow meter implemented on a micro-machined glass chip. In this embodiment an electric pulse is introduced to the flow by a pair of electrodes generating a composition variation mark. The sensors in this preferred embodiment consist of pairs of electrodes which sense conductivity. The marking and sensing techniques are broadly discussed in U.S. Pat. No. 7,225,683 incorporated herein by reference. FIG. 1a shows the assembled circuit board 11 with an inlet port 12 and outlet port 13, in a form of a nipple, attached to the face of the top layer 16 of the chip 11, aligned with the inlet through hole 14 and outlet through hole 15 in the top layer of the chip (not visible) respectively. The fluid enters the flow meter 10 through the inlet port 12 and exit the flow meter 10 through the outlet port 13. In further embodiments it is advantageous that the inlet and outlet ports are merely internal channels in the chip 11. For example in one embodiment the flow meter is part of a drug delivery system where the pump of the system is a MEMS type such as the Debiotech micromachined pump (Debiotech S A, Lausanne, C H, U.S. Pat. No. 7,005,078) implemented in a chip, and the drug administration means is a micro needle array which can be directly attached to the chip. In this case it will be advantageous to have the flow meter of the present invention implemented directly on the pump's chip thus reducing cost, complexity and size of the drug delivery device assembly.

FIG. 1b shows an exploded view of the assembly of FIG. 1a wherein the top layer 16 of the PCB 11 has been removed and tilted in order to expose the internal features. The inlet hole 14 (leading from the inlet nipple 12) and the outlet hole 15 (leading to the outlet nipple 13) in the top layer 16 are now visible. A groove 18 in the back of the top layer 16 of the chip 11 serves as the flow passage connecting between the inlet hole 14 and the outlet hole 15. Conductive channels (tabs) 21 are printed on the second layer 19 of the chip 11 leading from the electronic circuit (not shown) to the excitation electrodes 22 and to three pairs of sensor electrodes 23 (×3). When the chip layers 16 and 19 are aligned together the tips of the tabs 22 and 23 are exposed to the fluid conduit 18. The first pair of tabs 22, closest to the inlet port 12 are the exciting electrodes and the three following pairs of tabs 23 are the sensor electrodes.

The exciting electrode tabs receive a voltage pulse from the electronic circuit. According to one embodiment said voltage pulse causes the exciting electrodes 22 to pass current through the fluid thus causing a local variation in the flow in the form of ionization or oxidation. The mark progressed with the flow and is detected by the sensor electrodes 23. The electrodes 23 are measuring the conductivity of the passing fluid. The interference mark affects the conductivity of the fluid thus detected by the control circuit. The plurality of the sensing electrodes 23 allow calculation of the flow velocity from the time of generating the mark to the time it reaches the sensor electrodes 23 or from the difference in time that the mark reaches each sensor electrodes 23. The processor uses at least three time events to analyze the instant flow and its at least first derivative resulting in a more accurate approximation of the mass flow rate than what could be analyzed from just two time events.

FIG. 1 illustrates an arrangement of the flow meter on a PCB substrate. In a further embodiment a flow meter with similar arrangement is implemented in a chip in similar fashion as described, for example, in U.S. Pat. No. 4,532,811 to Miller, Jr. et al., and U.S. Pat. No. 5,533,412 to Jerman, et al. This embodiment of the flow meter can be integrated into the same chip with a micro-pump such as the Debiotech micromachined pump (Debiotech S A, Lausanne, C H, U.S. Pat. No. 7,005,078), or with a valve implemented in the same chip.

In one embodiment, the spacing between sensors 23a and 23b and the distance between sensor 23b and 23c is 350 μm from center to center. The same spacing is used between the exciting electrodes 22 and sensor 23a.

Figure 2:
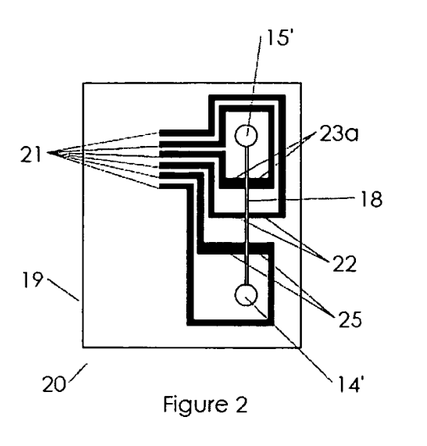
FIG. 2 shows a schematic of a zone broadening flow sensor.

FIG. 2 demonstrates a preferred embodiment of a mark diffusion meter. In this embodiment the mark is a composition variation pulse introduced to the flow through a pair of electrodes 22 and the sensors are conductivity sensing electrodes 23 and 25 as discussed in U.S. Pat. No. 7,225,683 incorporated here by reference. A flow conduit 18 connects between an inlet well 14' and an outlet well 15' to which an inlet passage and an outlet passage are connected respectively (not shown). The marking electrodes 22 are disposed along the flow conduit. A pair of electrodes of a first sensor 23a are located downstream from the marking electrodes 22 and a pair of electrodes of a second sensor 25 are positioned upstream from the marking position 22 at an equal distance. The flow channel in this embodiment is uniform. When a mark is introduced to the fluid in the conduit the mark travels downstream downstream in the direction of arrow "A" with the fluid and at the same time the mark center diffuses in the fluid in the upstream and downstream directions. In the event that the fluid in the conduit is standing or when the flow speed is lower than the speed in which the mark diffuses in the fluid, the diffusion front of the mark will advance upstream from the marking electrodes 22, and will eventually be sensed by the sensor 25. The diffusion rates and the flow rates will be distinguished by analyzing the time it takes the mark to reach the first sensor 23a and the time it takes the mark to reach the second sensor 25. If the flow in the conduit is standing the mark will reach the sensors at the same time, providing a true-positive mean for sensing zero flow. It will be obvious to those skilled in the art that the diffusion sensor of the present embodiment can measure flows in both direction and that the upstream/downstream and inlet/outlet terminology does not limit the extent of the practical applications.

Above a certain flow rate the upstream sensor 25 will not sense the mark and the sensor will serve as a flow switch that determines the existence of flow. It will be obvious to those skilled in the art that the upstream sensor is not necessary located at the same distance from the excitation electrodes 22 as the downstream sensor 23, and that the flow conduit dimension do not have to be the same at the upstream section as the downstream section. It will also be obvious to those skilled in the art that the upstream sensor 25 can be located in another direction which is not the upstream direction. For example the sensor 25 can be located in a pocket extending in a perpendicular direction to the flight tube direction.

Figure 3:
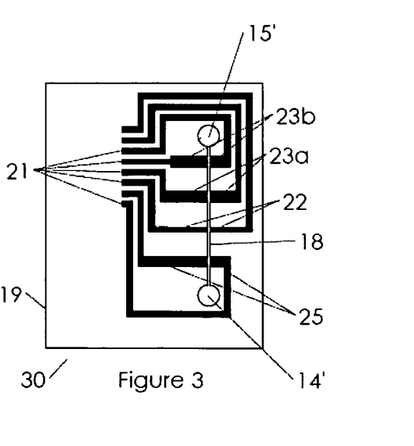
FIG. 3 shows a schematic of a preferred embodiment of a Time-of-Flight mass-flow-meter combined with a diffusion meter.

FIG. 3 demonstrates a further preferred embodiment of the present invention where a diffusion meter and a flow meter are combined. The actual flow rate is corrected to diffusion rate errors. The diffusion meter acting as a flow switch (as described in FIG. 2) provides redundant information of the existence of the flow which can help analyze the mass flow sensor properly functions. In addition the redundant information from the mass flow meter and the diffusion meter can be analyzed to detect air bubbles in the flow.

Figure 4:
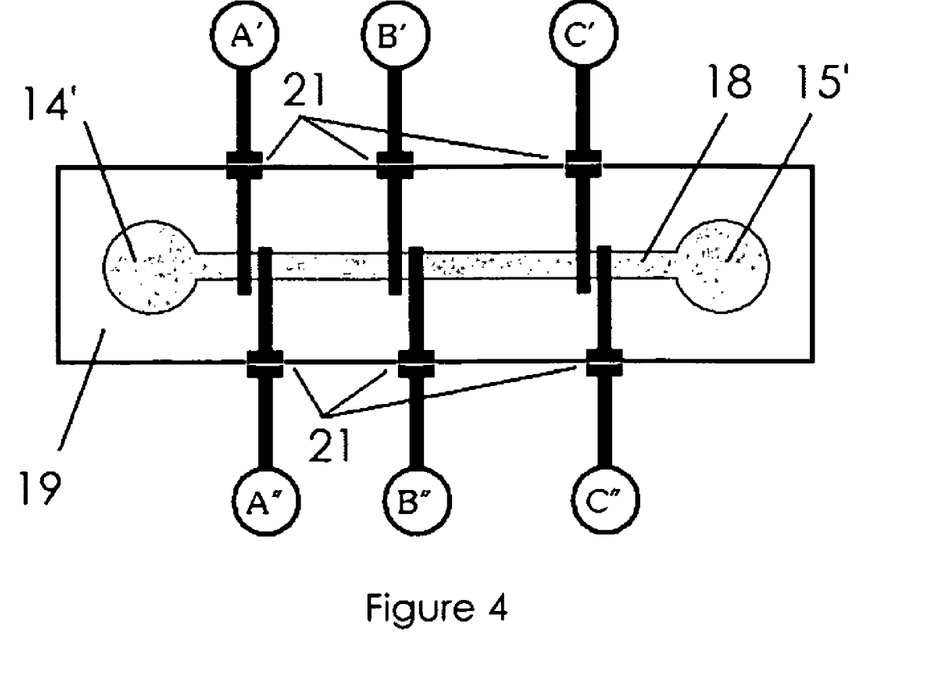
FIGS. 4-14 depict various alternative constructions for meters which are contemplates by the various embodiments described herein.

FIG. 4 shows a schema of one preferred embodiment of the mass flow meter of the present invention. A flow conduit 18 is machined on a substrate 19 having an inlet well 14 and an outlet well 15 leading to couplers (not shown) that will communicate the fluid (shown in gray) to a target location where said fluid is going to be utilized. Three electrode couples are shown having one end reaching into the flow conduit 18 and are in directly contact the fluid when such fluid present in the flow conduit 18; and a second end terminating with contact tabs 21 communicating said electrodes with the control circuitry. Tabs A' and A" (together referred to as Tabs A) are connected to the mark generation circuitry and can cause the electrode to deposit a mark in the flow, according to the description provided above. Tabs B and Tabs C are connected to detecting circuitry and utilize the corresponding electrodes to sense the presence or absence of the mark of the flow as well as the intensity of said mark, according to the description provided above. Thus the arrangement can be utilized to measure mass flow rates according to the approach provided above.

Figure 5:
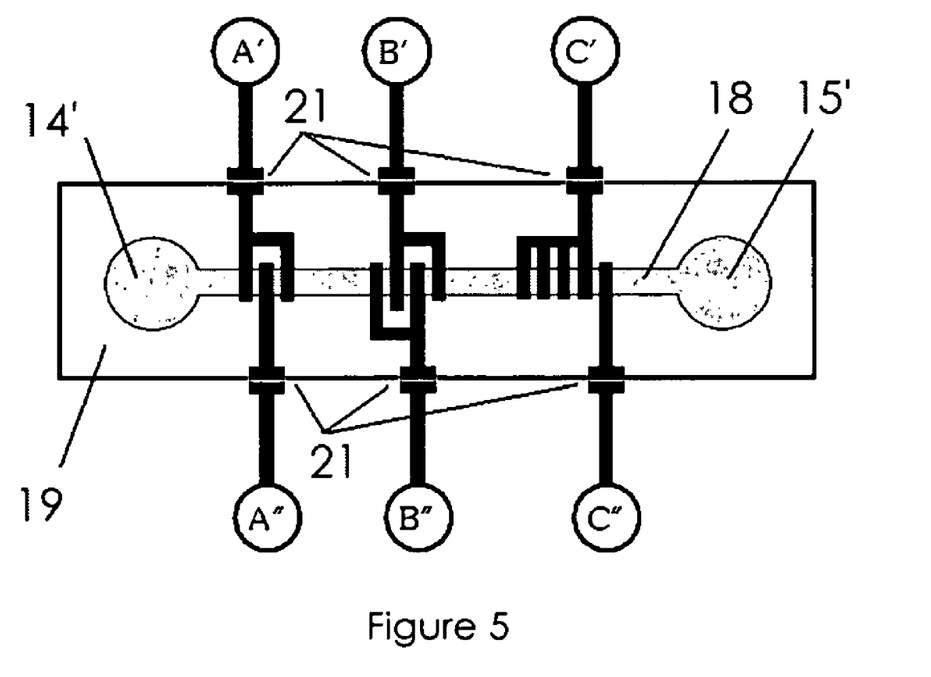

FIG. 5 demonstrates another preferred embodiment showing various geometries of the electrodes to emphasis the generality of the term electrode in this text. An electrode can have any shape and any number of ends reaching the flow conduit and as long as all of its branches are electrically connected it is considered a single electrode.

Figure 6:
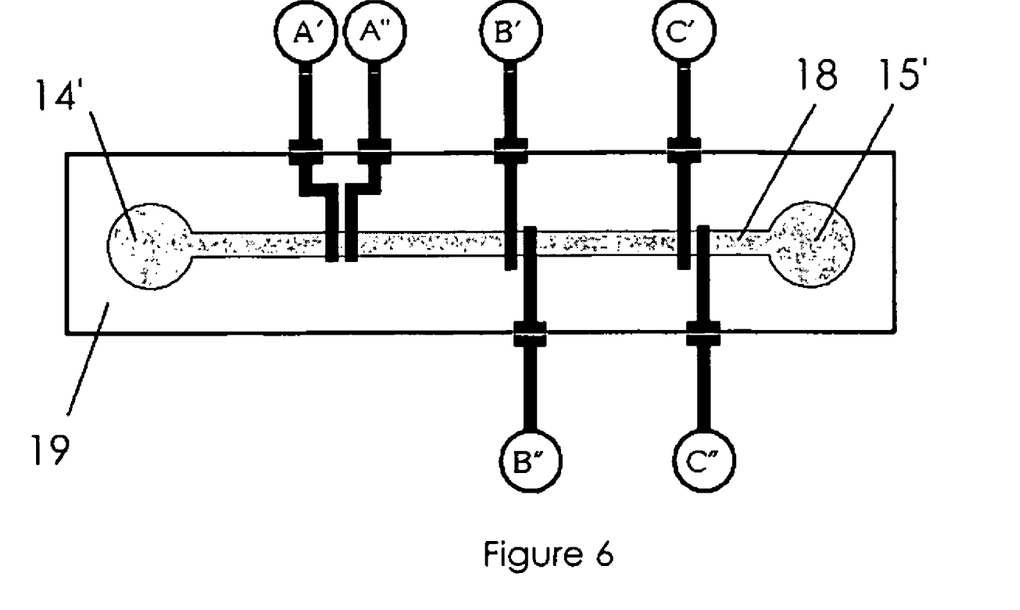
Figure 7:
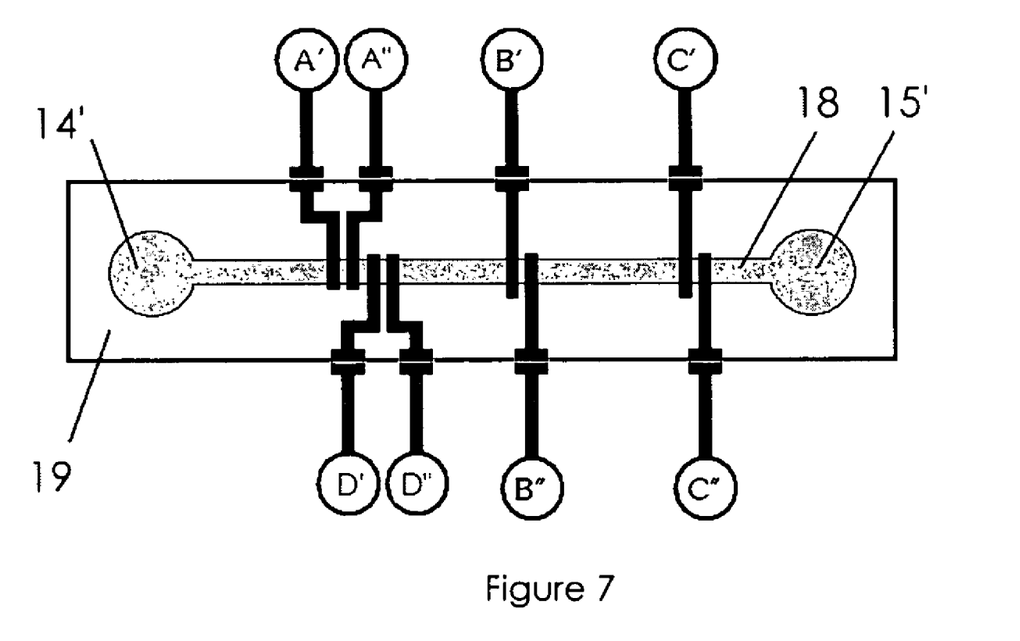

FIG. 6 demonstrates another preferred embodiment of the present invention showing that the electrodes can reach the conduit 18 from any direction FIG. 7 shows another preferred embodiment of the present invention where a fourth couple of electrodes are implemented and having one end in contact with the fluid in the flow conduit 18 and a second end terminating with contact Tabs D leading to detection circuitry in the control circuitry and forming a fourth sensor. The fourth couple of electrodes are positioned proximal to the introduction location, close enough such that in the absence of flow or at sub-range flows the fourth sensor could sense the diffusion of the mark or the convection of the mark to the electrode.

Figure 8:
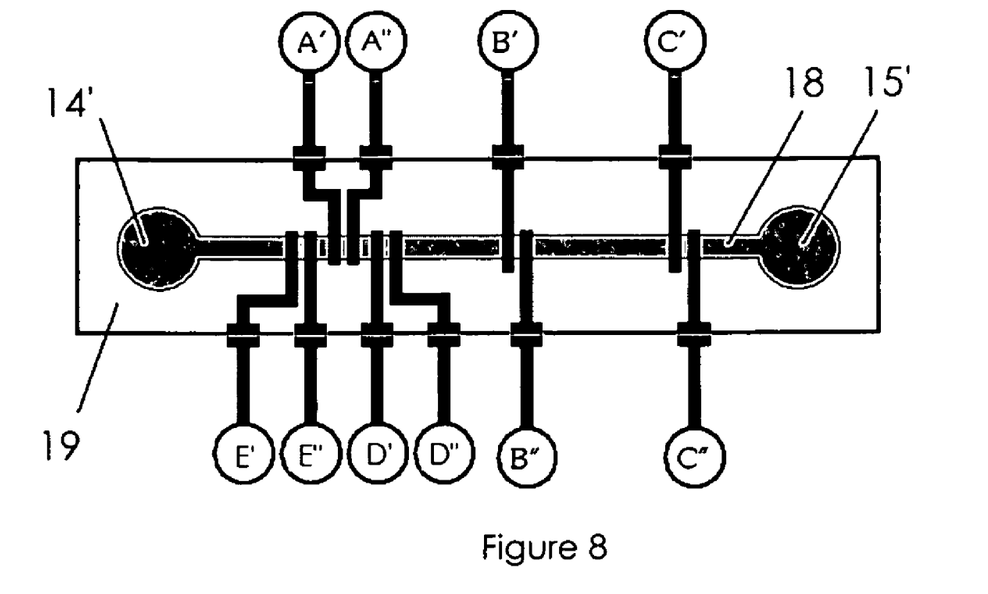

FIG. 8 shows a similar embodiment to the embodiment of FIG. 7 with the difference that a fifth couple of electrodes are implemented having one end directly contacting the fluid and a second end terminating with tabs E leading to mark detection circuitry in the control circuitry forming a fifth sensor. The Fifth couple of electrodes is positioned upstream and proximal to the introduction location. As with the fourth couple of electrodes the fifth sensor associated with fifth couple of electrodes can sense the mark at no flow or at very low flows due to diffusion or combination of diffusion and convection. The arrangement is advantageous as by sensing the TOF flight of the mark to the fourth sensor and the fifth sensor the presence of zero flow or very low flow can be determined. If no flow is determined the diffusion rate of the mark in the flow or a correction value for mass flow rate measurement can also be determined.

Figure 9:
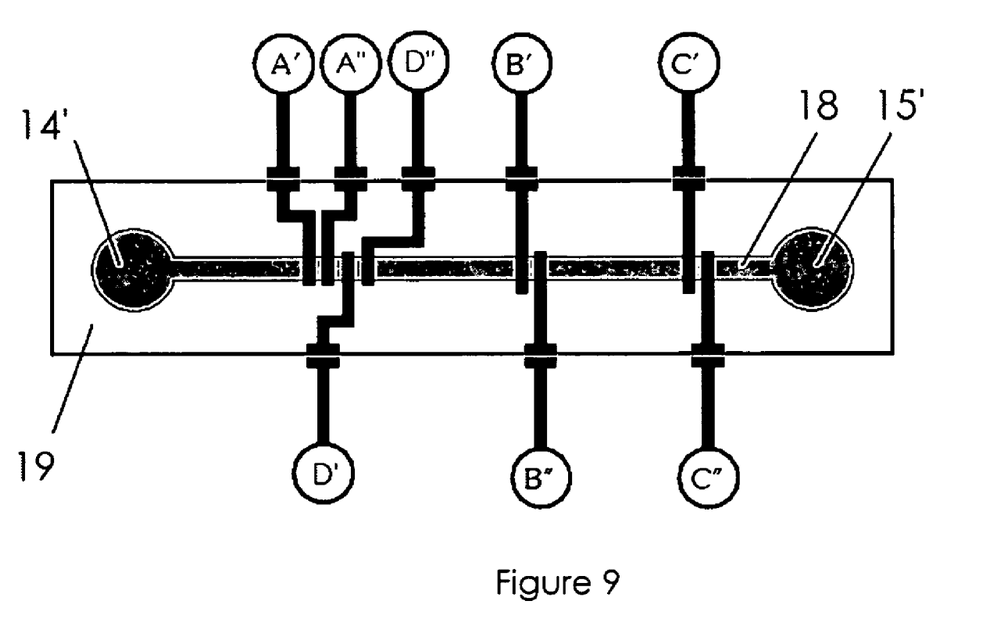

FIG. 9 shows another schematic arrangement of the practical arrangement of FIG. 8

Figure 10:
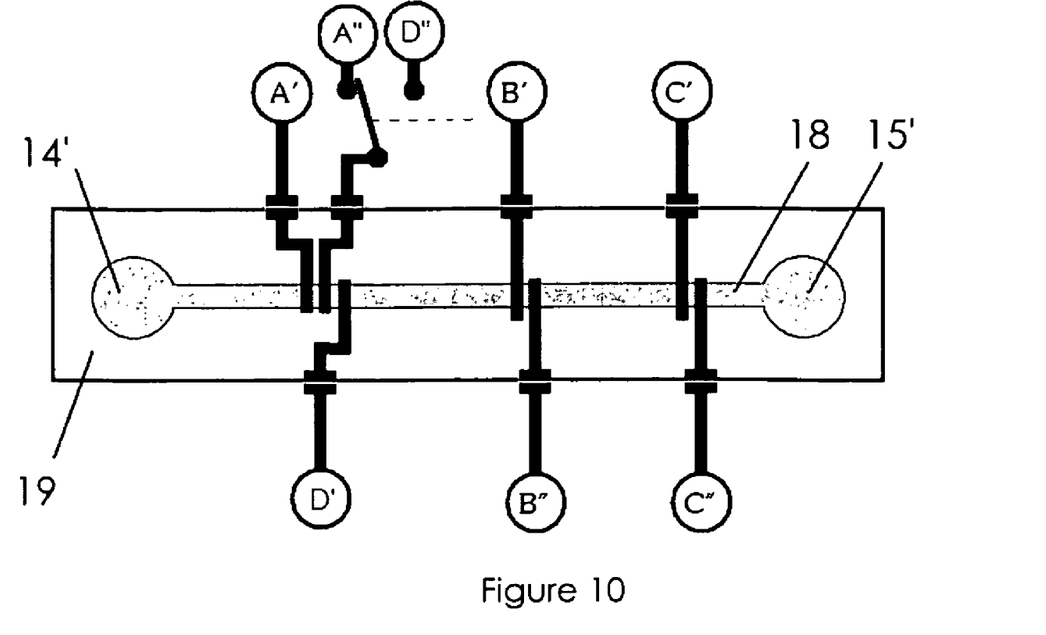
Figure 11:
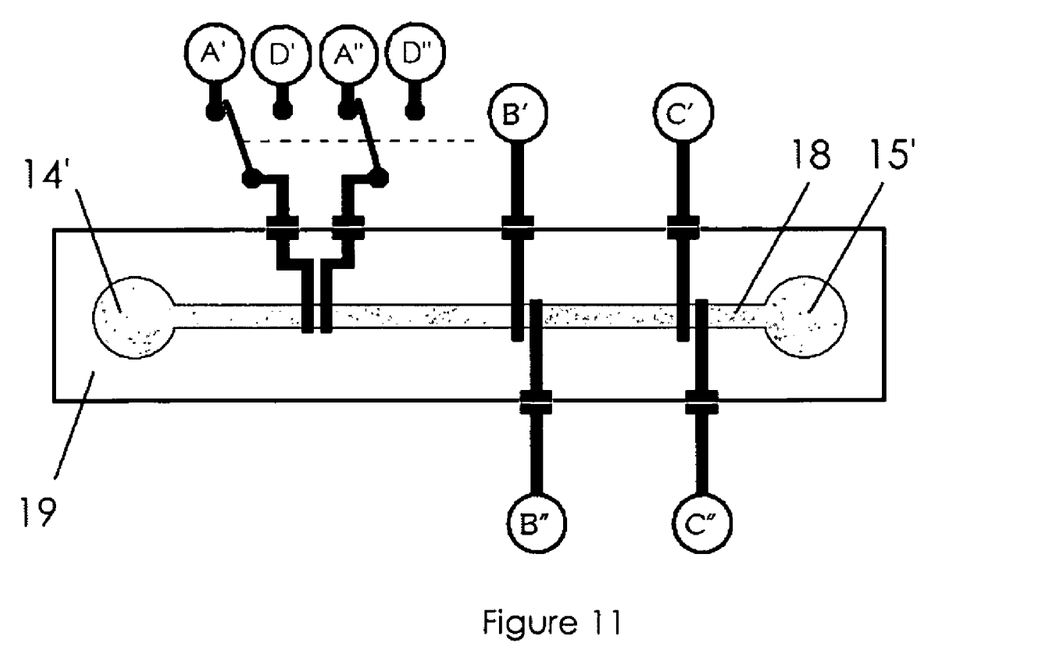

FIG. 10 demonstrates the mark generator and the fourth sensor sharing an electrode. The electrode is switched between the two circuits at different stages of the measuring interval FIG. 11 demonstrates an arrangement where the mark generator and the fourth sensor are sharing two electrodes. It will be obvious to those skilled in the art that by using two sets of switching over electrodes at two positions along the flow line the flow meter can measure flows in the conduit is possible. Other arrangement are possible for bi directional flow measurements including implementing additional sensors or introduction locations. along the flow conduit or parallel flow conduit.

Figure 12:
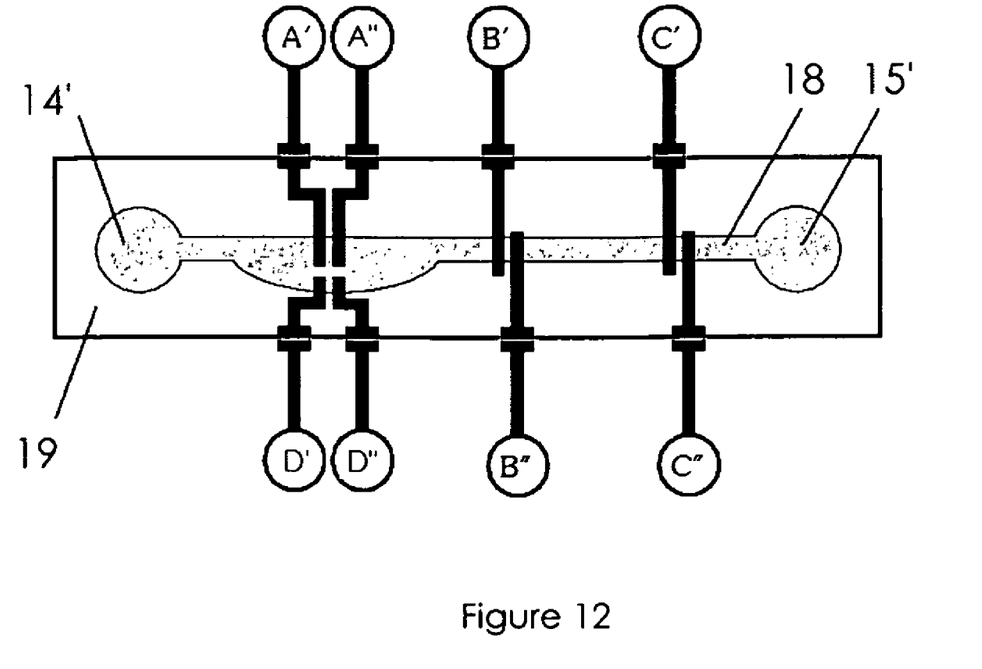

FIG. 12 demonstrates another arrangement were the electrodes of the fourth sensor are in contact with the fluid in the flow conduit in a position which is perpendicular to the flow conduit at the introduction location. The fourth sensor can efficiently sense the arrival of a mark due to diffusion.

Figure 13:
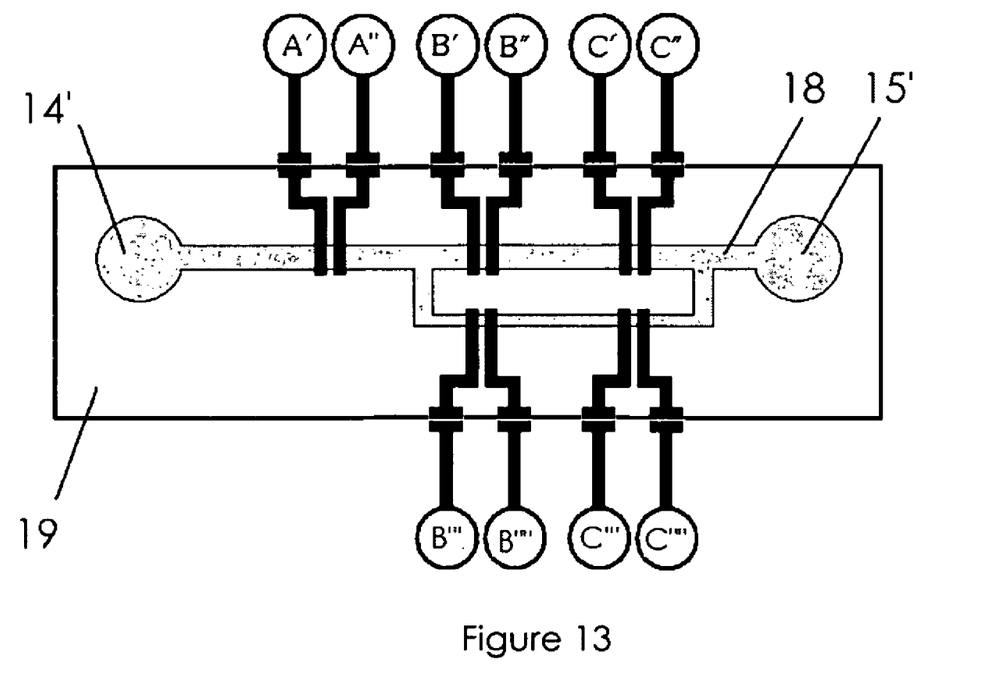

FIG. 13 show an embodiment where the flow conduit branches out and where the two conduit share common introduction location.

Figure 14:
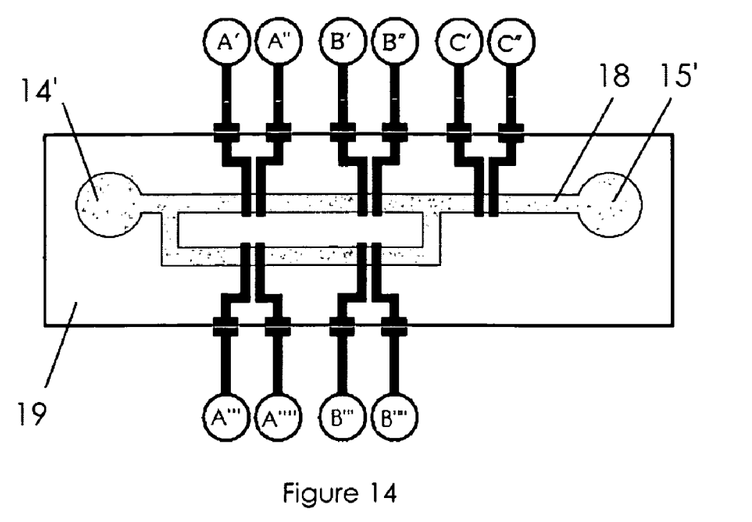

FIG. 14 shows an embodiment where the flow conduit branches out and where the two conduits share a common sensor.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

What is claimed is:

1. A device for use in a mass flow rate metering system which incorporates a flow medium traveling along a flow path towards a destination, wherein the destination utilizes the flow medium, said device comprising:
   (a) a flow conduit insertable into at least a portion of the flow path to define a flow channel, said flow conduit having an inlet and an outlet, said outlet including a coupler for establishing fluid communication between the flow conduit and the destination;
   (b) at least one mark depositor operatively connectable to a signal generator to introduce at least one mark into the flow channel at an introduction location and thereby cause a variation in the flow medium; and
   (c) a plurality of mark detection sensors each comprising at least one electrode having an associated detection portion disposed in the flow channel in direct contact with said flow medium, each sensor configured to detect variations in the flow medium caused by introduction of said at least one mark.

2. A device according to claim 1 wherein said mark depositor comprises at least two electrodes in direct contact with the flow medium.

3. A device according to claim 2 wherein said mark depositor and at least one of said sensors share at least one common electrode.

4. A device according to claim 1 wherein a plurality of said sensors share a common electrode.

5. A device according to claim 1 wherein each of said sensors is situated downstream of the introduction location.

6. A device according to claim 1 wherein at least one of said sensors is situated downstream of the introduction location to detect the mark as it travels in a downstream direction, and at least another of said sensors is situated upstream of the introduction location to detect diffusion and convection of the mark.

7. A device according to claim 1 wherein one sensor is situated downstream of the introduction location, and wherein at least another sensor has an associated detection portion that is disposed along the flow channel at a position which not downstream of said one sensor.

8. A device according to claim 7 wherein said at least another sensor is disposed along the flow channel at a position which is not downstream of the introduction location.

9. A device according to claim 1 wherein, for flow range applications having anticipated flow rates up to approximately 5 liters per hour, each sensor is located within a range that is between approximately 100 microns to approximately 50000 microns from the introduction location.

10. A device according to claim 1 wherein said flow conduit, said mark depositor and said sensors are incorporated into an integrated circuit chip.

11. A device according to claim 1 wherein said flow conduit branches into at least two parallel portions.

12. A device for use in a mass flow metering system to detect zero or sub-range flow, comprising:
(a) a flow conduit containing a flow medium and defining a flow channel;
(b) at least one mark depositor operatively connectable to a signal generator to introduce at least one mark into the flow channel at an introduction location, and;
(c) a plurality of sensors each disposed along the flow conduit and configured to detect said mark in the flow medium, at least one of said sensors situated downstream from the introduction location for use in detecting the mark as it travels in a downstream direction, and at least another one of said sensors situated elsewhere along the flow conduit for use in detecting diffusion and convection of the mark.

13. A device according to claim 12 wherein said at least another one of said sensors is situated upstream of the introduction location.

14. A device according to claim 12 wherein said mark depositor comprises at least two electrodes in direct contact with said flow medium.

15. A device according to claim 14 wherein said mark depositor and at least one of said sensors share at least one common electrode.

16. A device according to claim 12 wherein a plurality of said sensors share a common electrode.

17. A device according to claim 12 wherein each of said sensors is situated downstream of the introduction location.

18. A device according to claim 12 wherein at least one sensor is situated downstream of the introduction location to detect the mark as it travels in a downstream direction, and at least another sensor is situated upstream of the introduction location to detect diffusion and convection of the mark.

19. A device according to claim 12 wherein, for flow range applications having anticipated flow rates up to approximately 5 liters per hour, each sensor is located within a range that is between approximately 100 microns to approximately 50000 microns from the introduction location.

20. A device according to claim 12 wherein said flow conduit, said mark depositor and said sensors are incorporated into an integrated circuit chip.

21. A device according to claim 20 wherein said flow conduit branches into at least two parallel portions.

22. A method of deriving flow rate of a flow medium within a flow conduit, comprising:
(a) depositing a mark into the flow conduit at an introduction location;
(b) taking, with a plurality of sensors that are spaced apart from one another along the flow conduit, a plurality of time-of-flight (TOF) readings after introduction of the mark into the flow conduit, wherein one of said sensors is situated downstream of the introduction location, and at least another of said sensors is disposed along the flow conduit at a position which is not downstream of the introduction location, and whereby TOF readings by the non-downstream sensor are used to derive at least one of a mark diffusion rate, diffusion correction factor, zero flow, and sub-range flow; and
(c) ascertaining flow rate of the flow medium based on said plurality of TOF readings.

23. The method of claim 22 whereby a plurality of instant flow rates of the mark are derived from said plurality of TOF readings and the flow rate is ascertained from said instant flow rates and at least a first derivative in time of at least one instant flow rate, and further comprising inputing said flow rates and their respective derivatives into a flow curve approximation formula.

24. A method for use in detecting zero or sub-range flow rate of a flow medium moving within a flow conduit in a flow direction, comprising:
(a) introducing a mark into the flow conduit at an introduction location;
(b) taking at least a first time of flight (TOF) reading from a first sensor having an associated first detection portion situated along the flow conduit;
(c) taking at least a second TOF reading from a second sensor having an associated second detection portion that is spaced apart along the flow direction from the first detection portion, said second TOF reading corresponding to diffusion and convection of the mark; and
(d) ascertaining an existence or non-existence of zero or sub-range flow based on said first and second TOF readings.

25. A method according to claim 24 further comprising determining a diffusion rate of the mark in the flow conduit.

26. A method for use in detecting zero or sub-range flow rate of a flow medium moving within a flow conduit in a flow direction, comprising:
(a) introducing a mark into the flow conduit at an introduction location;
(b) taking at least one (TOF) reading from a sensor having an associated detection portion situated along the flow conduit; and
(c) ascertaining an existence or non-existence of zero or sub-range flow based on said at least one TOF reading and a known diffusion rate of the mark within the flow conduit.

27. A method according to claim 26 wherein said first sensor is located within approximately 500 μm from the introduction location.

28. A method of deriving flow rate of a flow medium within a flow conduit, comprising:
(a) depositing a mark into the flow conduit at an introduction location;
(b) taking a plurality of time-of-flight (TOF) readings after introduction of the mark into the flow conduit, including:
taking at least a first TOF reading with a first sensor that is situated downstream of the introduction location, said first TOF reading corresponding to travel of the mark in a downstream direction; and
taking at least a second TOF reading with a second sensor that is situated upstream of the introduction location, said second TOF reading corresponding to diffusion and convection of the mark in the flow conduit; and
(c) ascertaining flow rate of the flow medium based on said plurality of TOF readings.

29. A method of claim 28 whereby a plurality of instant flow rates of the mark are derived from said plurality of TOF readings, and the flow rate is ascertained from said instant flow rates and at least a first derivative in time of at least one instant flow rate, and further comprising inputing said flow rates and their respective derivatives into a flow curve approximation formula.

* * * * *